(12) United States Patent
Nozawa (10) Patent No.: US 8,220,574 B2
(45) Date of Patent: Jul. 17, 2012

(54) INVERTER CONTROL DEVICE AND VEHICLE

(75) Inventor: Natsuki Nozawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 394 days.

(21) Appl. No.: 12/668,156

(22) PCT Filed: Jul. 17, 2008

(86) PCT No.: PCT/JP2008/063339
§ 371 (c)(1),
(2), (4) Date: Jan. 7, 2010

(87) PCT Pub. No.: WO2009/011461
PCT Pub. Date: Jan. 22, 2009

(65) Prior Publication Data
US 2010/0193267 A1 Aug. 5, 2010

(30) Foreign Application Priority Data

Jul. 19, 2007 (JP) ................................. 2007-188435

(51) Int. Cl.
*B60W 20/00* (2006.01)
(52) U.S. Cl. ................... 180/65.275; 180/65.21; 363/74
(58) Field of Classification Search .................. 180/65.1, 180/65.21, 65.265, 65.275, 68.1, 68.2, 68.3, 180/68.4; 903/904, 906, 930; 363/74; 318/433, 318/434, 139, 140
See application file for complete search history.

(56) References Cited

U.S. PATENT DOCUMENTS

| 7,656,690 B2* | 2/2010 | Yamada et al. ................. 363/71 |
| 8,027,181 B2* | 9/2011 | Hamatani ........................ 363/98 |
| 2009/0279337 A1 | 11/2009 | Hamatani | |

FOREIGN PATENT DOCUMENTS

| JP | 11-089270 A | 3/1999 |
| JP | 2004-166341 A | 6/2004 |
| JP | 2005-348510 A | 12/2005 |
| JP | 2006-325341 A | 11/2006 |
| JP | 2007-143293 A | 6/2007 |

OTHER PUBLICATIONS

German Office Action issued Oct. 13, 2011 for counterpart German Application No. 112008001911.8.

* cited by examiner

*Primary Examiner* — John Walters
(74) *Attorney, Agent, or Firm* — Sughrue Mion, PLLC (57) ABSTRACT

An inverter control device includes a DC power supply for outputting a first DC voltage, a voltage conversion unit for converting a voltage level of the DC voltage and supplying a first DC voltage to an inverter, a temperature detection unit for detecting an ambient temperature (element temperature) of the inverter, and a control device. The control device controls the voltage conversion unit such that the voltage VH lowers as the ambient temperature is lower, based on a temperature value representing a result of detection by a temperature sensor. A tolerable surge amount can thus sufficiently be ensured at a low temperature.

10 Claims, 11 Drawing Sheets

INVERTER CONTROL DEVICE AND VEHICLE

TECHNICAL FIELD

The present invention relates to an inverter control device and a vehicle, and particularly to a control device for controlling an inverter in accordance with a temperature of the inverter and a vehicle incorporating the control device.

BACKGROUND ART

Hybrid vehicles and electric vehicles have recently attracted attention as environmentally friendly vehicles. A hybrid vehicle is a vehicle including, in addition to a conventional engine, a motor driven by a DC power supply via an inverter, as a motive power source. Namely, the hybrid vehicle obtains a motive power source by driving the engine and also obtains a motive power source by converting a DC voltage from the DC power supply to an AC voltage through an inverter and revolving the motor with the resultant AC voltage.

Meanwhile, an electric vehicle is a vehicle including a motor driven by a DC power supply via an inverter as a motive power source.

In many cases, an inverter includes a semiconductor switching element such as an IGBT (Insulated Gate Bipolar Transistor) or a MOSFET (Metal Oxide Semiconductor Field Effect Transistor). A breakdown voltage (hereinafter simply referred to as a "withstand voltage") of the IGBT or the MOSFET is lower as a temperature around the same or a junction temperature is lower. Therefore, an input voltage of the inverter should appropriately be controlled in accordance with an ambient temperature of the inverter.

Japanese Patent Laying-Open No. 2004-166341 discloses a voltage conversion device for converting a voltage from a power supply such that operation performance of an inverter is prevented from lowering when an ambient temperature lowers and a motor counterelectromotive force voltage is higher than an inverter withstand voltage. This voltage conversion device includes a voltage converter for varying a voltage level of a voltage input from a power supply and supplying an output voltage to an electric load, and a drive circuit for driving the voltage converter such that a temperature of the electric load is raised. Specifically, as a temperature of cooling water for the inverter is significantly lower than a reference temperature, a boost ratio of a boost converter (voltage converter) is set higher. As loss of the inverter (electric load) is thus further increased, the temperature of the inverter is raised.

In the inverter including the semiconductor switching element, a surge voltage is produced due to parasitic inductance of a line while the semiconductor switching element is turned off. Here, the surge voltage refers to a voltage increase from the input voltage of the inverter to the counterelectromotive force voltage produced by the parasitic inductance. In order for the counterelectromotive force voltage not to exceed the withstand voltage of the semiconductor switching element, the input voltage of the inverter should be determined in consideration of the voltage increase by the surge voltage.

When the temperature of the semiconductor switching element is low, however, the withstand voltage of the semiconductor switching element is lowered. When the input voltage of the inverter is constant in spite of the low withstand voltage of the semiconductor switching element, a difference between the withstand voltage and the input voltage, that is, a tolerable amount of the surge voltage, becomes smaller.

Accordingly, as the inverter is driven while the temperature of the semiconductor switching element is low, the semiconductor switching element may adversely be affected. Japanese Patent Laying-Open No. 2004-166341 does not particularly mention control of the voltage converter when the temperature of the electric load is not yet sufficiently high.

DISCLOSURE OF THE INVENTION

An object of the present invention is to provide an inverter control device capable of driving an inverter while protecting the same even when an ambient temperature of the inverter lowers and a vehicle incorporating the inverter control device.

In summary, the present invention is directed to an inverter control device for controlling an inverter. The inverter control device includes a DC power supply for outputting a first DC voltage, a voltage conversion unit for converting a voltage level of the first DC voltage and supplying a second DC voltage to the inverter, a temperature detection unit for detecting an ambient temperature of the inverter, and a control unit. The control unit controls the voltage conversion unit such that the second DC voltage is lower as the ambient temperature is lower, based on a result of detection by the temperature detection unit. The control unit controls an operation of the inverter such that the second DC voltage is converted to an AC voltage.

Preferably, the control unit stops the inverter when it is determined that the second DC voltage exceeds an upper limit value.

More preferably, the control unit lowers the upper limit value as the ambient temperature is lower.

Further preferably, the control unit lowers the upper limit value after the second DC voltage is lowered.

Preferably, the inverter control device further includes a heat exchange device for exchanging heat with the inverter by circulating a heat exchange medium capable of exchanging heat with the inverter. The ambient temperature is a temperature of the heat exchange medium.

More preferably, the heat exchange medium is cooling water.

Preferably, the control unit controls the voltage conversion unit such that the second DC voltage is lower as the ambient temperature is lower, when it is determined that the ambient temperature is lower than a prescribed temperature.

More preferably, the control unit sets an operation frequency of the inverter differently between a case where the ambient temperature is higher than the prescribed temperature and a case where the ambient temperature is lower than the prescribed temperature.

According to another aspect of the present invention, a vehicle includes an inverter, a DC power supply for outputting a first DC voltage, a voltage conversion unit for converting a voltage level of the first DC voltage and supplying a second DC voltage to the inverter, a temperature detection unit for detecting an ambient temperature of the inverter, and a control unit. The control unit controls the voltage conversion unit such that the second DC voltage is lower as the ambient temperature is lower, based on a result of detection by the temperature detection unit. The control unit controls an operation of the inverter such that the second DC voltage is converted to an AC voltage.

Preferably, the control unit stops the inverter when it is determined that the second DC voltage exceeds an upper limit value.

More preferably, the control unit lowers the upper limit value as the ambient temperature is lower.

Further preferably, the control unit lowers the upper limit value after the second DC voltage is lowered.

Preferably, the vehicle further includes a heat exchange device for exchanging heat with the inverter by circulating a heat exchange medium capable of exchanging heat with the inverter. The ambient temperature is a temperature of the heat exchange medium.

More preferably, the heat exchange medium is cooling water.

Preferably, the control unit controls the voltage conversion unit such that the second DC voltage is lower as the ambient temperature is lower, when it is determined that the ambient temperature is lower than a prescribed temperature.

More preferably, the control unit sets an operation frequency of the inverter differently between a case where the ambient temperature is higher than the prescribed temperature and a case where the ambient temperature is lower than the prescribed temperature.

Therefore, according to the present invention, the inverter can be driven while it is protected even when the ambient temperature of the inverter is lowered.

BEST MODES FOR CARRYING OUT THE INVENTION

An embodiment of the present invention will be described hereinafter in detail with reference to the drawings. In the drawings, the same or corresponding elements have the same reference characters allotted, and description thereof will not be repeated.

First Embodiment

Figure 1:
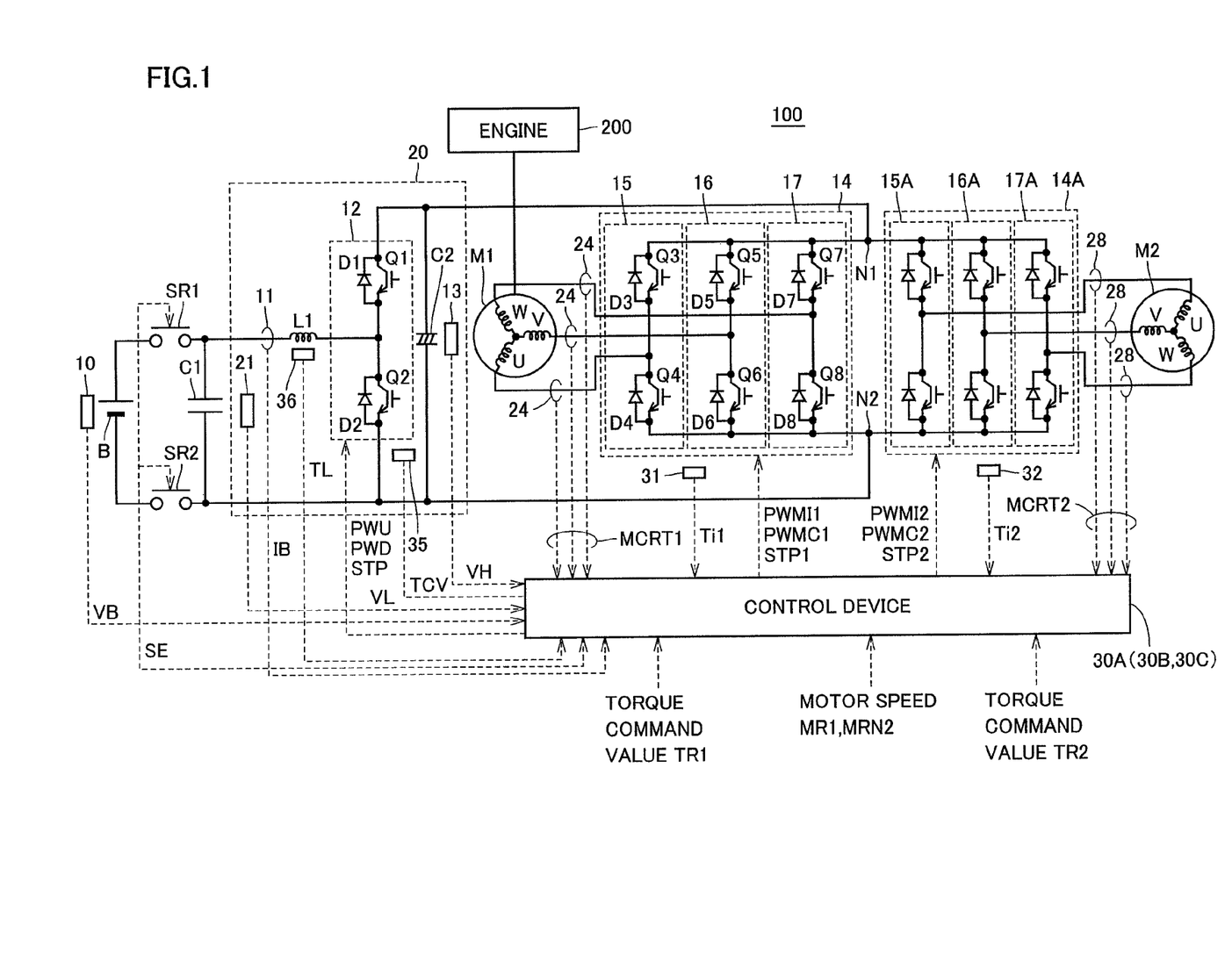
FIG. 1 is a diagram showing a configuration of a vehicle 100 on which an inverter drive device according to the present embodiment is mounted.

FIG. 1 is a diagram showing a configuration of a vehicle 100 on which an inverter drive device according to the present embodiment is mounted. Vehicle 100 is a hybrid vehicle including, in addition to an engine, a motor driven by a DC power supply via an inverter as a motive power source.

Referring to FIG. 1, vehicle 100 includes a DC power supply B, a voltage sensor 10, system relays SR1 and SR2, a capacitor C1, a voltage conversion unit 20, an inverter 14, a current sensor 24, and a control device 30A.

DC power supply B is a secondary battery such as a nickel hydride battery or a lithium ion battery. Voltage sensor 10 detects a DC voltage VB output from DC power supply B and outputs a detected DC voltage value VB to control device 30A. System relays SR1 and SR2 are turned on and off in response to a signal SE from control device 30A. More specifically, system relays SR1 and SR2 are turned on in response to signal SE at the H (logic high) level and turned off in response to signal SE at the L (logic low) level. Capacitor C1 smoothes a voltage across terminals of DC power supply B while system relays SR1 and SR2 are turned on.

Voltage conversion unit 20 includes a voltage sensor 21, a current sensor 11, a reactor L1, a converter 12, a capacitor C2, and a voltage sensor 13. Reactor L1 has one end connected to a positive electrode of DC power supply B through system relay SR1.

Current sensor 11 detects a DC current that flows between DC power supply B and converter 12 and outputs the detected current to control device 30A as a DC current value IB.

Converter 12 includes IGBT elements Q1 and Q2 connected in series between output terminals of converter 12 outputting a voltage VH and diodes D1 and D2 connected in parallel to IGBT elements Q1 and Q2, respectively.

Reactor L1 has the other end connected to an emitter of IGBT element Q1 and a collector of IGBT element Q2. Diode D1 has a cathode connected a collector of IGBT element Q1 and an anode connected to the emitter of IGBT element Q1. Diode D2 has a cathode connected to the collector of IGBT element Q2 and an anode connected to an emitter of IGBT element Q2.

Voltage sensor 21 detects a voltage on the input side of converter 12 as a voltage value VL. Current sensor 11 detects a current that flows through reactor L1 as current value IB. Capacitor C2 is connected to the output side of converter 12, stores energy sent from converter 12, and smoothes the voltage. Voltage sensor 13 detects a voltage on the output side of converter 12, that is, a voltage across electrodes of capacitor C2, as a voltage value VH.

Receiving a boost potential from converter 12, inverter 14 drives an AC motor M1. In addition, inverter 14 returns electric power generated by AC motor M1 during regenerative braking to converter 12. Here, converter 12 is controlled by control device 30A such that it operates as a step-down circuit.

Inverter 14 includes a U-phase arm 15, a V-phase arm 16, and a W-phase arm 17. U-phase arm 15, V-phase arm 16 and W-phase arm 17 are connected in parallel between output lines of converter 12.

U-phase arm 15 includes IGBT elements Q3 and Q4 connected in series and diodes D3 and D4 connected in parallel to IGBT elements Q3 and Q4 respectively. Diode D3 has a cathode connected to a collector of IGBT element Q3 and an anode connected to an emitter of IGBT element Q3. Diode D4 has a cathode connected to a collector of IGBT element Q4 and an anode connected to an emitter of IGBT element Q4.

V-phase arm 16 includes IGBT elements Q5 and Q6 connected in series and diodes D5 and D6 connected in parallel to IGBT elements Q5 and Q6 respectively. Diode D5 has a cathode connected to a collector of IGBT element Q5 and an anode connected to an emitter of IGBT element Q5. Diode D6 has a cathode connected to a collector of IGBT element Q6 and an anode connected to an emitter of IGBT element Q6.

W-phase arm 17 includes IGBT elements Q7 and Q8 connected in series and diodes D7 and D8 connected in parallel to IGBT elements Q7 and Q8 respectively. Diode D7 has a cathode connected to a collector of IGBT element Q7 and an anode connected to an emitter of IGBT element Q7. Diode D8 has a cathode connected to a collector of IGBT element Q8 and an anode connected to an emitter of IGBT element Q8.

An intermediate point of the arm of each phase is connected to an end of each phase of a coil of each phase of AC motor M1. Namely, AC motor M1 is a three-phase permanent magnet motor, and three coils of respective U-, V- and W-phases have one ends connected together to a neutral point. The U-phase coil has the other end connected to a connection node between IGBT elements Q3 and Q4. In addition, the V-phase coil has the other end connected to a connection node between IGBT elements Q5 and Q6. Moreover, the W-phase coil has the other end connected to a connection node between IGBT elements Q7 and Q8.

Current sensor 24 detects a current that flows in AC motor M1 as a motor current value MCRT1 and outputs motor current value MCRT1 to control device 30A.

Control device 30A receives a torque command value TR1, a motor speed MRN1, voltage values VB, VL and VH, current value IB, and motor current value MCRT1. Then, control device 30A outputs a boost instruction PWU, a step-down instruction PWD, and a stop instruction STP to voltage conversion unit 20. In addition, control device 30A outputs to inverter 14, a drive instruction PWMI1 for converting a DC voltage representing an output of converter 12 to an AC voltage for driving AC motor M1, a regeneration instruction PWMC1 for converting an AC voltage generated by AC motor M1 to a DC voltage and returning the DC voltage to converter 12 side, and a stop instruction STP1.

An operation of voltage conversion unit 20 will now briefly be described. Converter 12 in voltage conversion unit 20 operates as a boost circuit that serves as a forward conversion circuit for supplying electric power from DC power supply B to inverter 14 during power running. In contrast, during regenerative running, converter 12 also operates as a step-down circuit that serves as a reverse conversion circuit for returning electric power generated by AC motor M1 to DC power supply B.

Converter 12 operates as the boost circuit by turning on and off IGBT element Q2 while maintaining IGBT element Q1 in the off state. Namely, while IGBT element Q2 is in the on state, a path where a current flows from the positive electrode of DC power supply B through reactor L1 and IGBT element Q2 to a negative electrode of DC power supply B is formed. While this current flows, energy is stored in reactor L1.

Then, when IGBT element Q2 is turned off, energy stored in reactor L1 flows toward inverter 14 through diode D1. A voltage across the electrodes of capacitor C2 is thus increased. Therefore, the output voltage of converter 12 provided to inverter 14 is boosted.

On the other hand, converter 12 operates as the step-down circuit by turning on and off IGBT element Q1 while maintaining IGBT element Q2 in the off state. Namely, while IGBT element Q1 is in the on state, the current returned from inverter 14 flows toward IGBT element Q1, the reactor and DC power supply B.

In addition, while IGBT element Q1 is in the off state, a loop formed of reactor L1, DC power supply B and diode D2 is formed, so that the energy stored in reactor L1 is returned to DC power supply B. In this reverse conversion, a time period during which DC power supply B receives electric power is longer than a time period during which inverter 14 supplies electric power, and the voltage of inverter 14 is stepped down and returned to DC power supply B. The operation of voltage conversion unit 20 is performed by appropriately controlling the power running operation and the regenerative operation above.

It is noted that regenerative control includes braking involving electric power regeneration when a driver who drives vehicle 100 operates a foot brake. In addition, regenerative control includes such a case that the vehicle is decelerated or acceleration thereof is stopped while electric power regeneration is carried out, by turning off an accelerator pedal during running instead of operating the foot brake.

Vehicle 100 further includes a current sensor 28 and an inverter 14A.

Inverter 14A is connected in parallel to inverter 14 between a node N1 and a node N2 and both inverters are connected to voltage conversion unit 20.

Receiving a boost potential from converter 12, inverter 14A drives an AC motor M2. In addition, inverter 14A returns electric power generated by AC motor M2 during regenerative braking to converter 12. Here, converter 12 is controlled by control device 30A such that it operates as a step-down circuit.

In addition, in vehicle 100, that is, in a hybrid car, an engine 200 and AC motor M1 exchanges motive power with each other. Namely, AC motor M1 starts the engine in some cases, while AC motor M1 serves as a generator for generating electric power upon receiving motive power of the engine in other cases.

Inverter 14A includes a U-phase arm 15A, a V-phase arm 16A, and a W-phase arm 17A. U-phase arm 15A, V-phase arm 16A and W-phase arm 17A are connected in parallel between the output lines of converter 12. As configurations of U-phase arm 15A, V-phase arm 16A and W-phase arm 17A are the same as those of U-phase arm 15, V-phase arm 16 and W-phase arm 17 respectively, description thereof will not be repeated.

Intermediate points of the arms of respective U-, V- and W-phases of inverter 14A are connected to one ends of coils of U-, V- and W-phases of AC motor M2, respectively. Namely, AC motor M2 is a three-phase permanent magnet motor, and three coils of respective U-, V- and W-phases have the other ends connected together to a neutral point.

Current sensor 28 detects a value MCRT2 of a motor current that flows in AC motor M2 and outputs motor current value MCRT2 to control device 30A.

Control device 30A further receives a torque command value TR2, a motor speed MRN2 and motor current value MCRT2 corresponding to AC motor M2, in addition to torque command value TR1, motor speed MRN1, voltage values VB, VL and VH, current value IB, and motor current value MCRT1.

In response to these inputs, control device 30A outputs boost instruction PWU, step-down instruction PWD and stop instruction STP to voltage conversion unit 20.

In addition, control device 30A outputs to inverter 14, drive instruction PWMI1 for converting a DC voltage representing an output of converter 12 to an AC voltage for driving AC motor M1, regeneration instruction PWMC1 for converting an AC voltage generated by AC motor M1 to a DC voltage and returning the DC voltage to converter 12 side, and stop instruction STP1.

Further, control device 30A outputs to inverter 14A, a drive instruction PWMI2 for converting a DC voltage representing an output of converter 12 to an AC voltage for driving AC motor M2, a regeneration instruction PWMC2 for converting an AC voltage generated by AC motor M2 to a DC voltage and returning the DC voltage to converter 12 side, and a stop instruction STP2.

Vehicle 100 further includes a temperature sensor 36 for measuring a temperature of reactor L1 and outputting a temperature value TL, a temperature sensor 35 for measuring a temperature of converter 12 and outputting a temperature value TCV, a temperature sensor 31 for measuring a temperature of inverter 14 and outputting a temperature value Ti1, and a temperature sensor 32 for measuring a temperature of inverter 14A and outputting a temperature value Ti2. It is noted that twelve temperature sensors for detecting temperatures of IGBT elements Q3 to Q6 included in inverter 14 and six IGBT elements included in inverter 14A (twelve IGBT elements in total) may be provided.

Control device 30A controls voltage conversion unit 20 such that voltage VH is lower as the ambient temperature of inverter 14 (14A) is lower, based on temperature values Ti1 and Ti2, and controls inverter 14 (14A) such that voltage VH is converted to an AC voltage.

Figure 2:
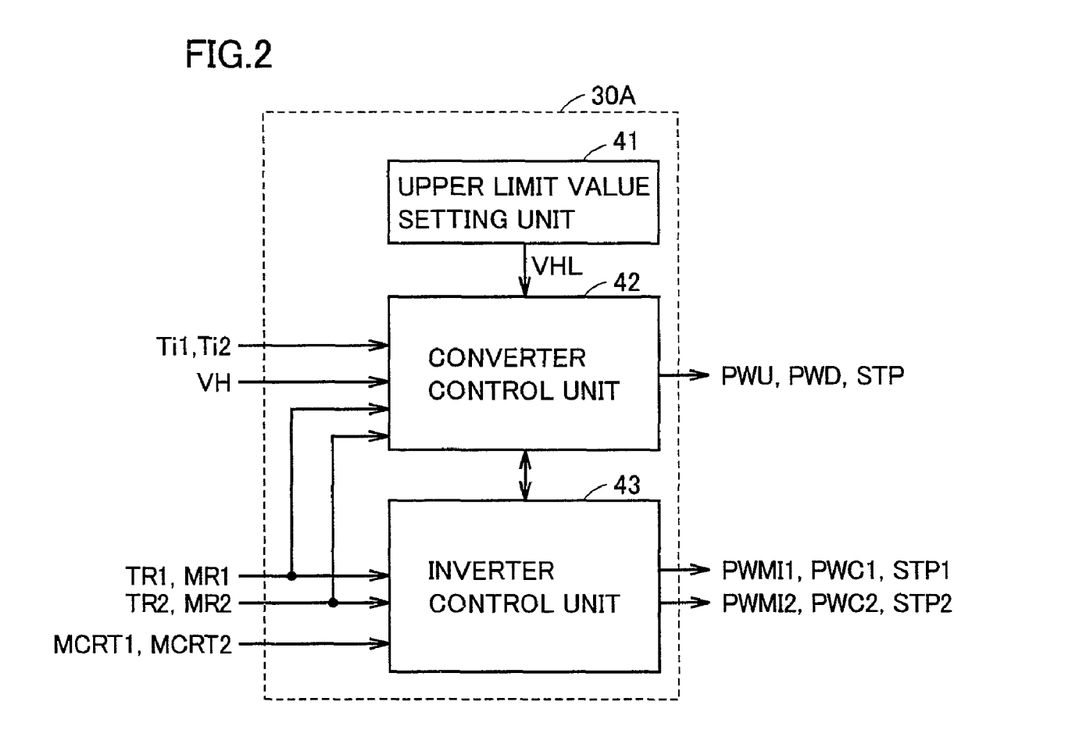
FIG. 2 is a functional block diagram of a control device 30A in FIG. 1.

FIG. 2 is a functional block diagram of control device 30A in FIG. 1. It is noted that control device 30A shown in FIG. 2 may be implemented by software or by hardware. Referring to FIG. 2, control device 30A includes an upper limit value setting unit 41, a converter control unit 42, and an inverter control unit 43.

Upper limit value setting unit 41 sets an upper limit value VHL of voltage VH input to inverter 14 (14A). In the first embodiment, upper limit value VHL is a constant value.

Converter control unit 42 receives upper limit value VHL from upper limit value setting unit 41. Converter control unit 42 further receives temperature values Ti1 and Ti2, voltage value VH, torque command values TR1 and TR2, and motor speeds MRN1 and MRN2. Then, converter control unit 42 generates and outputs boost instruction PWU and step-down instruction PWD for controlling voltage conversion unit 20. When any lower one of temperature values Ti1 and Ti2 is lower than a prescribed temperature value, converter control unit 42 lowers voltage value VH in accordance with that temperature value. When voltage value VH exceeds upper limit value VHL, converter control unit 42 outputs stop instruction STP for stopping voltage conversion unit 20.

Receiving torque command values TR1 and TR2, motor speeds MRN1 and MRN2 and motor current values MCRT1 and MCRT2, inverter control unit 43 outputs drive instruction PWMI1 and regeneration instruction PWMC1 for controlling inverter 14 and outputs drive instruction PWMI2 and regeneration instruction PWMC2 for controlling inverter 14A. When converter control unit 42 outputs stop instruction STP, inverter control unit 43 outputs stop instructions STP 1 and STP2 for stopping inverters 14 and 14A respectively.

Figure 3:
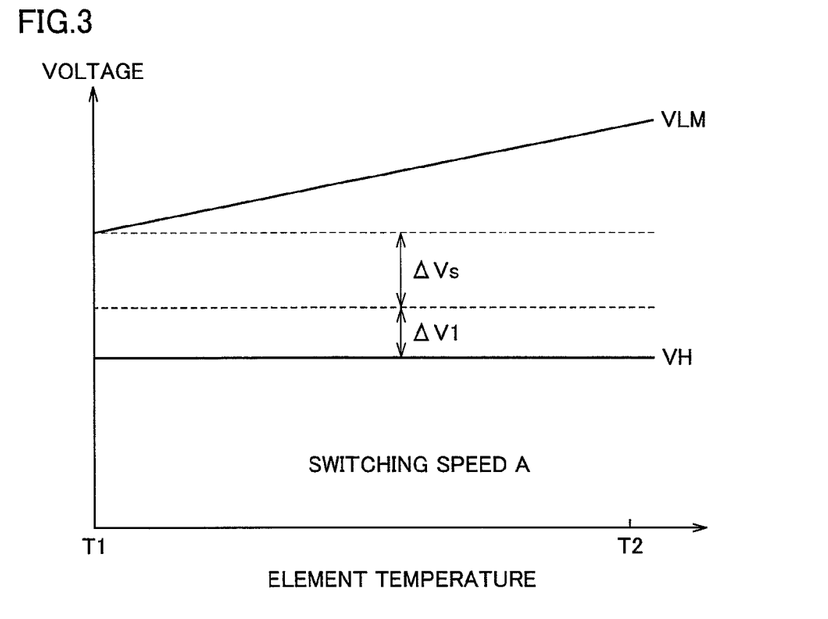
FIG. 3 is a diagram illustrating control of inverters 14 and 14A when a voltage VH is constant regardless of a temperature.

FIG. 3 is a diagram illustrating control of inverters 14 and 14A when voltage VH is constant regardless of a temperature. Referring to FIG. 3, temperatures T1 and T2 represent a lowest temperature and a highest temperature in an operation environment of the IGBT element included in inverter 14 (14A), respectively. A withstand voltage VLM represents a withstand voltage of the IGBT element. As shown in FIG. 3, withstand voltage VLM lowers as the temperature of the element is lower.

While the IGBT element is turned off, the surge voltage is produced due to the parasitic inductance of a line or the like. This surge voltage is added to the input voltage of inverters 14 and 14A. Here, there is an error of voltage VH (a voltage $\Delta V1$) caused by voltage sensor 13. Namely, voltage VH may be higher by $\Delta V1$. A tolerable surge amount is determined such that the sum of the tolerable surge amount of the IGBT element and the input voltage of the inverter does not exceed withstand voltage VLM. Therefore, the tolerable surge amount is calculated as $VLM-(VH+\Delta V1)$.

When voltage VH is constant in a range from temperature T1 to temperature T2, the tolerable surge amount is smallest at temperature T1. The tolerable surge amount at temperature T1 is denoted as $\Delta Vs$. As a switching speed (that is, an operation frequency) of inverters 14 and 14A is higher, the surge voltage becomes higher. Therefore, the switching speed is determined based on tolerable surge amount $\Delta Vs$ at temperature T1. Consequently, the switching speed of inverters 14 and 14A is limited to a speed A.

For example, as the tolerable surge amount at a room temperature is greater than the tolerable surge amount at temperature T1, the switching speed can be increased at a room temperature. In general, as the switching speed of the inverter is higher, efficiency of the inverter is improved. Under the control shown in FIG. 3, however, as the switching speed of the inverter is fixed, the problem of improvement in efficiency of the inverter at a room temperature arises.

Figure 4:
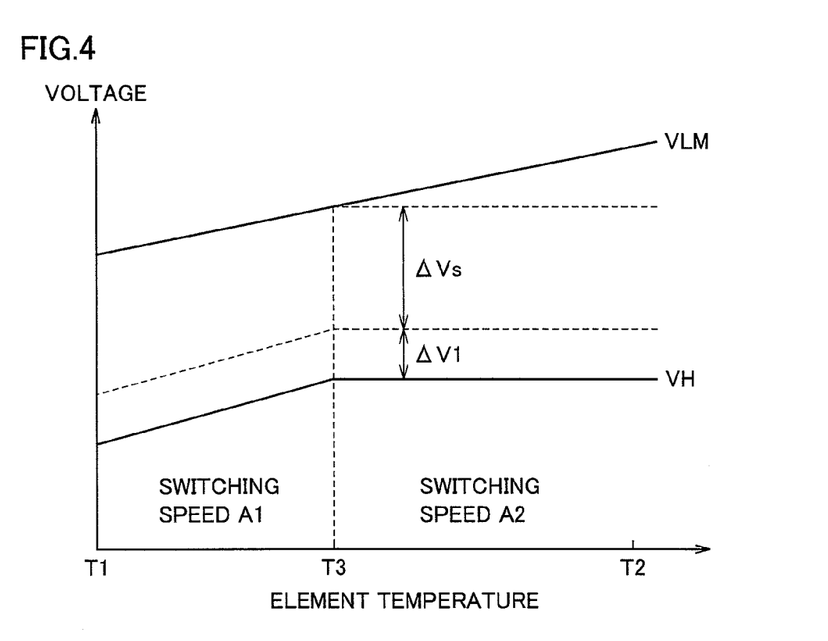
FIG. 4 is a diagram illustrating control of an inverter according to a first embodiment.

FIG. 4 is a diagram illustrating control of an inverter according to the first embodiment. Referring to FIG. 4, in the first embodiment, when the temperature of the element is lower than a temperature T3 (for example, 0° C.), converter control unit 42 lowers voltage VH as the temperature of the element is lower.

Drive performance of vehicle 100 may be affected by lowering in voltage VH. As can be seen with reference to FIGS. 4 and 3, however, according to the first embodiment, tolerable surge amount $\Delta Vs$ in a temperature region lower than temperature T3 can be increased. Therefore, according to the first embodiment, the switching speed in the temperature region lower than temperature T3 can be set to a speed A1 higher than speed A.

By making switching speed A1 higher than speed A, efficiency of the inverter at a temperature lower than temperature T3 can be improved. Consequently, efficiency of the inverter can be improved over the entire range of the operation temperature of the inverter, and hence fuel efficiency of vehicle 100 can be improved.

When the temperature of the element is in a range from temperature T2 to temperature T3, voltage VH is constant. The switching speed in this temperature range is set to a speed A2 different from speed A1. For example, by making speed A2 higher than speed A1, efficiency of the inverter can further be improved. According to the first embodiment, if speed A2 is equal to speed A, efficiency of the inverter over the entire range of the operation temperature of the inverter can be improved. Therefore, speed A2 may be equal to speed A.

Figure 5:
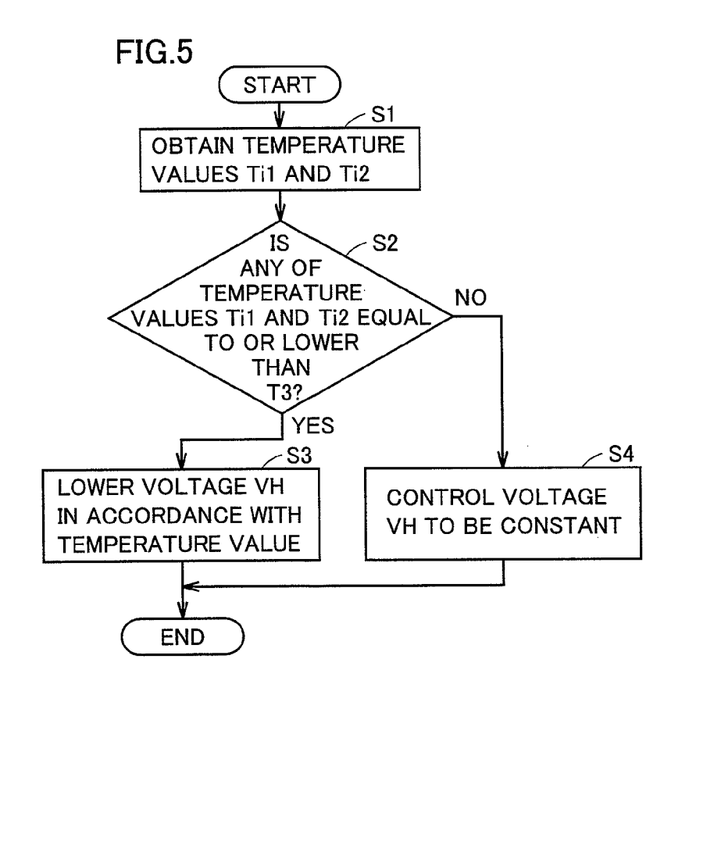
FIG. 5 is a flowchart illustrating processing for controlling voltage VH performed by control device 30A shown in FIG. 2.

FIG. 5 is a flowchart illustrating processing for controlling voltage VH performed by control device 30A shown in FIG. 2. The processing shown in this flowchart is performed, for example, every prescribed time.

Referring to FIGS. 5 and 2, initially, converter control unit 42 obtains temperature values Ti1 and Ti2 from temperature sensors 31 and 32 respectively (step S1). Then, converter control unit 42 determines whether any lower one of temperature values Ti1 and Ti2 is equal to or lower than temperature T3 shown in FIG. 4 or not (step S2). In measuring a temperature of each element in the inverter (in an example where twelve temperature sensors are provided), upper limit value setting unit 41 determines whether a temperature of the element lowest in temperature among twelve IGBT elements is equal to or lower than temperature T3 or not.

When the lower one of temperature values Ti1 and Ti2 is equal to or lower than temperature T3 (YES in step S2), converter control unit 42 lowers voltage VH in accordance with that temperature value (step S3). When the lower one of temperature values Ti1 and Ti2 is higher than temperature T3 (NO in step S2), converter control unit 42 controls voltage VH such that voltage VH is constant (step S4). When the processing in step S3 or step S4 ends, the entire process ends.

The first embodiment will comprehensively be described with reference to FIG. 1. The inverter control device according to the first embodiment includes DC power supply B for outputting DC voltage VB, voltage conversion unit 20 for converting the voltage level of DC voltage VB and supplying voltage VH to inverter 14 (14A), temperature sensor 31 (32) for detecting an ambient temperature of inverter 14 (14A) (the temperature of the element), and control device 30A. Control device 30A controls voltage conversion unit 20 such that voltage VH is lower as the ambient temperature is lower, based on temperature value Ti1 (Ti2) representing the result of detection by temperature sensor 31 (32). Control device 30A controls the operation of inverter 14 (14A) such that voltage VH is converted to an AC voltage.

Thus, the tolerable surge amount can sufficiently be ensured at a low temperature (in the temperature region lower than temperature T3 shown in FIG. 4). Consequently, as efficiency of the inverter at a low temperature can be improved, efficiency of the inverter over the entire operation temperature range of the inverter can be improved.

In addition, according to the present embodiment, as vehicle 100 includes this inverter control device, fuel efficiency over the entire temperature range of the inverter can be improved.

Second Embodiment

A vehicle according to a second embodiment includes a cooling system for cooling inverters 14 and 14A by circulating cooling water. An inverter control device according to the second embodiment controls voltage VH based on a temperature of the cooling water. Namely, in the second embodiment, the temperature of the cooling water is detected as the ambient temperature of the inverter.

Though the vehicle according to the second embodiment is different from vehicle 100 shown in FIG. 1 in including a control device 30B instead of control device 30A, the configuration thereof is otherwise the same as in FIG. 1 and hence description will not be repeated.

Figure 6:
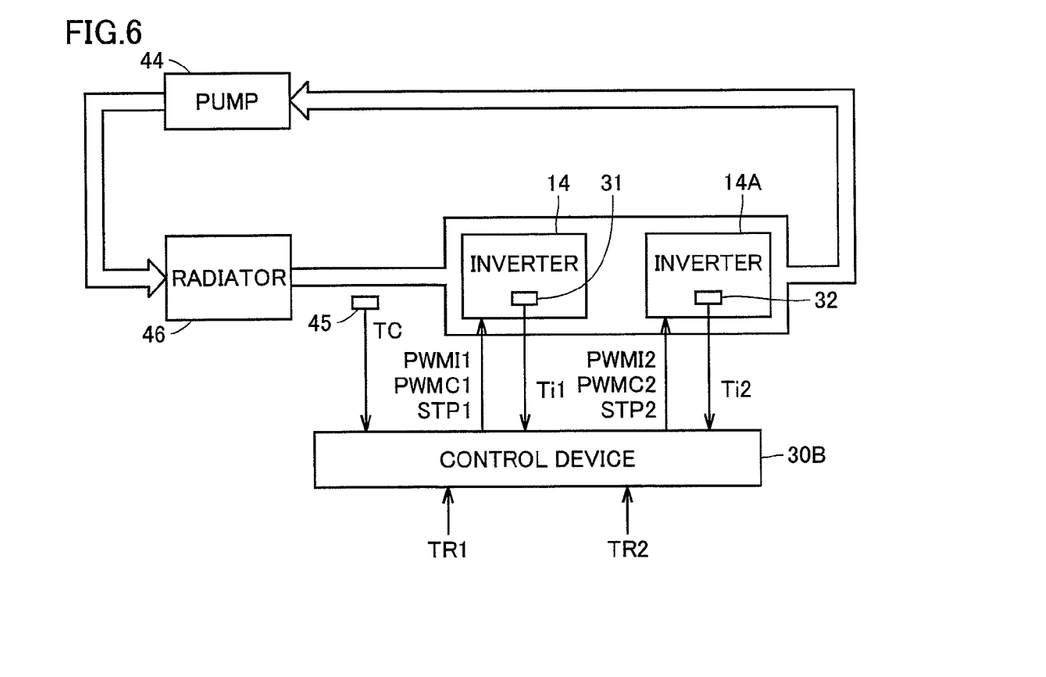
FIG. 6 is a diagram for illustrating a cooling system applied to a vehicle according to a second embodiment.

FIG. 6 is a diagram for illustrating the cooling system applied to the vehicle according to the second embodiment. Referring to FIG. 6, the cooling system includes a pump 44 for circulating the cooling water for cooling inverters 14 and 14A, a radiator 46 for radiating heat of the cooling water for cooling, and a temperature sensor 45 for measuring a temperature of the cooling water cooled by radiator 46 and outputting a temperature value TC.

Control device 30B receives temperature value TC from temperature sensor 45, receives temperature value Ti1 from temperature sensor 31, and receives temperature value Ti2 from temperature sensor 32. Control device 30B controls voltage VH by controlling voltage conversion unit 20 (see FIG. 1) based on temperature value TC. Control device 30B outputs drive instruction PWMI1 and regeneration instruction PWMC1 to inverter 14 and outputs drive instruction PWMI2 and regeneration instruction PWMC2 to inverter 14A, in accordance with torque command values TR1 and TR2 in response to an instruction from the driver. When inverters 14 and 14A are to be stopped, control device 30B outputs stop instructions STP1 and STP2 to inverters 14 and 14A, respectively.

Figure 7:
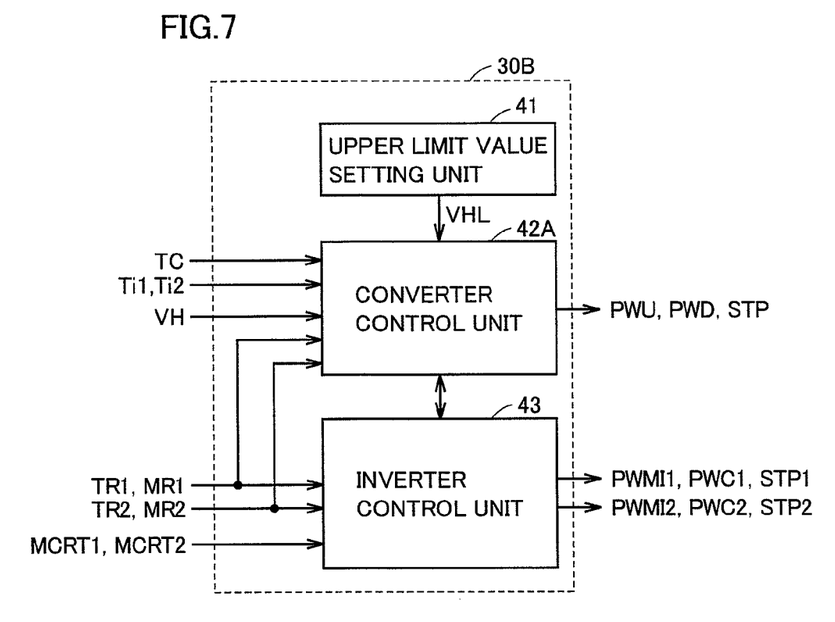
FIG. 7 is a functional block diagram of a control device 30B in FIG. 6.

FIG. 7 is a functional block diagram of control device 30B in FIG. 6. Referring to FIGS. 7 and 2, control device 30B is different from control device 30A in including a converter control unit 42A instead of converter control unit 42. Converter control unit 42A sets voltage VH based on temperature value TC. Converter control unit 42A is different from converter control unit 42 in this regard, however, it is otherwise the same as converter control unit 42. As the configuration of control device 30B is otherwise the same as that of corresponding portions of control device 30A, description will not be repeated.

Figure 8:
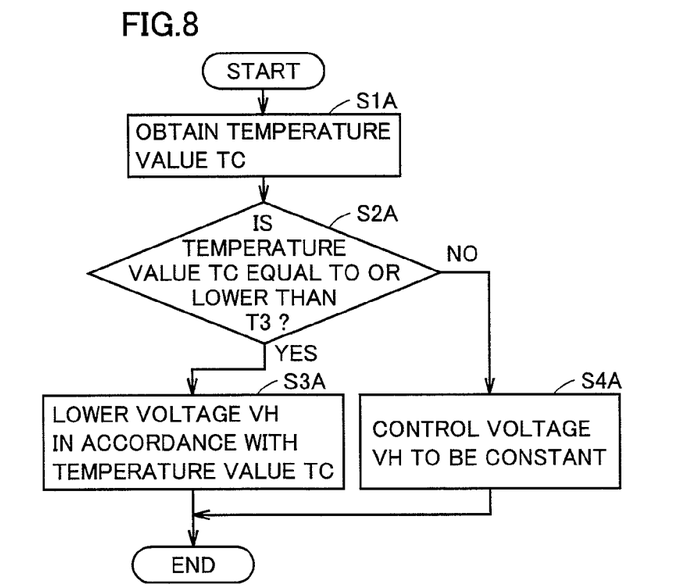
FIG. 8 is a flowchart illustrating processing for controlling voltage VH performed by control device 30B shown in FIG. 7.

FIG. 8 is a flowchart illustrating processing for controlling voltage VH performed by control device 30B shown in FIG. 7. The processing shown in this flowchart is performed, for example, every prescribed time.

Referring to FIGS. 8 and 7, initially, upper limit value setting unit 41A obtains temperature value TC from temperature sensor 45 (step S1A). Then, upper limit value setting unit 41A determines whether temperature value TC is equal to or lower than temperature T3 shown in FIG. 4 or not (step S2A).

When temperature value TC is equal to or lower than temperature T3 (YES in step S2A), converter control unit 42 lowers voltage VH in accordance with temperature value TC (step S3A). When temperature value TC is higher than temperature T3 (NO in step S2A), converter control unit 42 controls voltage VH such that voltage VH is constant (step S4A). When the processing in step S3A or step S4A ends, the entire process ends.

Figure 9:
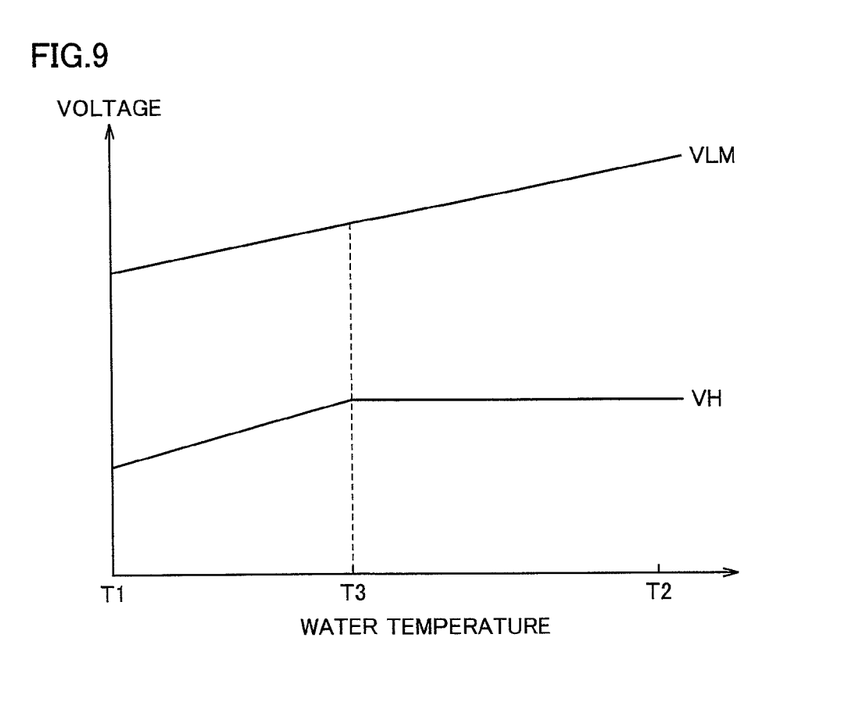
FIG. 9 is a diagram showing a first example of control of voltage VH by control device 30B.

FIG. 9 is a diagram showing a first example of control of voltage VH by control device 30B.

Figure 10:
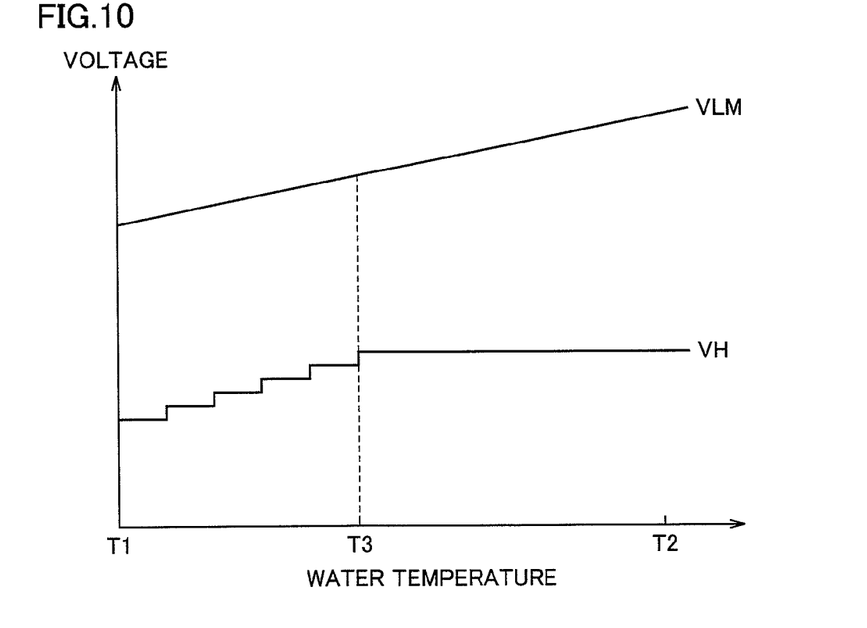
FIG. 10 is a diagram showing a second example of control of voltage VH by control device 30B.

FIG. 10 is a diagram showing a second example of control of voltage VH by control device 30B.

Referring to FIGS. 9 and 10, temperatures T1, T2 and T3 are the same as temperatures T1, T2 and T3 shown in FIG. 4, respectively. In the first example, in a temperature region lower than temperature T3, voltage VH lowers at a constant rate with respect to a temperature of the water. In the second example, voltage VH lowers in a stepwise fashion in this temperature region. As shown in FIGS. 9 and 10, how to lower voltage VH is not particularly limited, and it can appropriately be determined based on drive performance or the like of the vehicle.

In the first embodiment, voltage VH is controlled based on the temperature of the element in the inverter. Here, the range over which a temperature sensor for detecting a temperature of an element can conduct measurement should cover the range of an operation temperature of the element. In many cases, however, in order to improve measurement accuracy of the temperature sensor, the range over which the temperature sensor can conduct measurement is set to be relatively narrow. In particular, when the measurement range of the temperature sensor is broadened so as to measure also a low temperature, it is likely that measurement accuracy of the temperature sensor at a low temperature becomes poor. Therefore, in order to prevent measurement accuracy from lowering, the measurement range should be restricted.

If the measurement range is restricted, however, the temperature of the element tends to be out of the measurement range of the temperature sensor. In that case, since a function for protecting the element operates, for example, the inverter stops. Accordingly, the range of the operation temperature of the inverter is narrowed.

In order to avoid such a problem, for example, a method of making the IGBT element larger to suppress heat generation or a method of providing a plurality of temperature sensors different in measurement range may be employed. If such a method is adopted, however, the cost is increased.

In addition, the temperature of the element tends to fluctuate in accordance with a current that flows in the IGBT element. Therefore, when voltage VH is controlled in accordance with the temperature of the element, it is likely that voltage VH always fluctuates. In such a case, a behavior of vehicle 100 may be affected.

According to the second embodiment, voltage VH is controlled based on temperature TC of the cooling water. As shown in FIG. 6, temperature sensor 45 detects the temperature of the water upstream of inverters 14 and 14A. Accordingly, the temperature of the element in inverters 14 and 14A is higher than the temperature of the cooling water detected by temperature sensor 45.

Therefore, when voltage VH is controlled based on the temperature of the cooling water, voltage VH is lower than in an example where voltage VH is controlled based on the temperature of the element. Therefore, the IGBT element can more reliably be protected.

Moreover, as variation of the temperature of the cooling water is more gradual than that of the temperature of the element, slight fluctuation of voltage VH can be suppressed. Control of voltage VH can thus be made stable.

Further, as the range over which a temperature sensor for detecting the cooling water can conduct measurement is relatively broad (for example, from −50° C. to 100° C.), voltage VH can be controlled without increase in cost.

Third Embodiment

A vehicle according to a third embodiment is different from vehicle 100 shown in FIG. 1 in including a control device 30C instead of control device 30B. As the configuration of the vehicle according to the third embodiment is otherwise the same as that of vehicle 100, description will not be repeated. The vehicle according to the third embodiment includes a cooling system for inverters 14 and 14A as in the vehicle according to the third embodiment.

Figure 11:
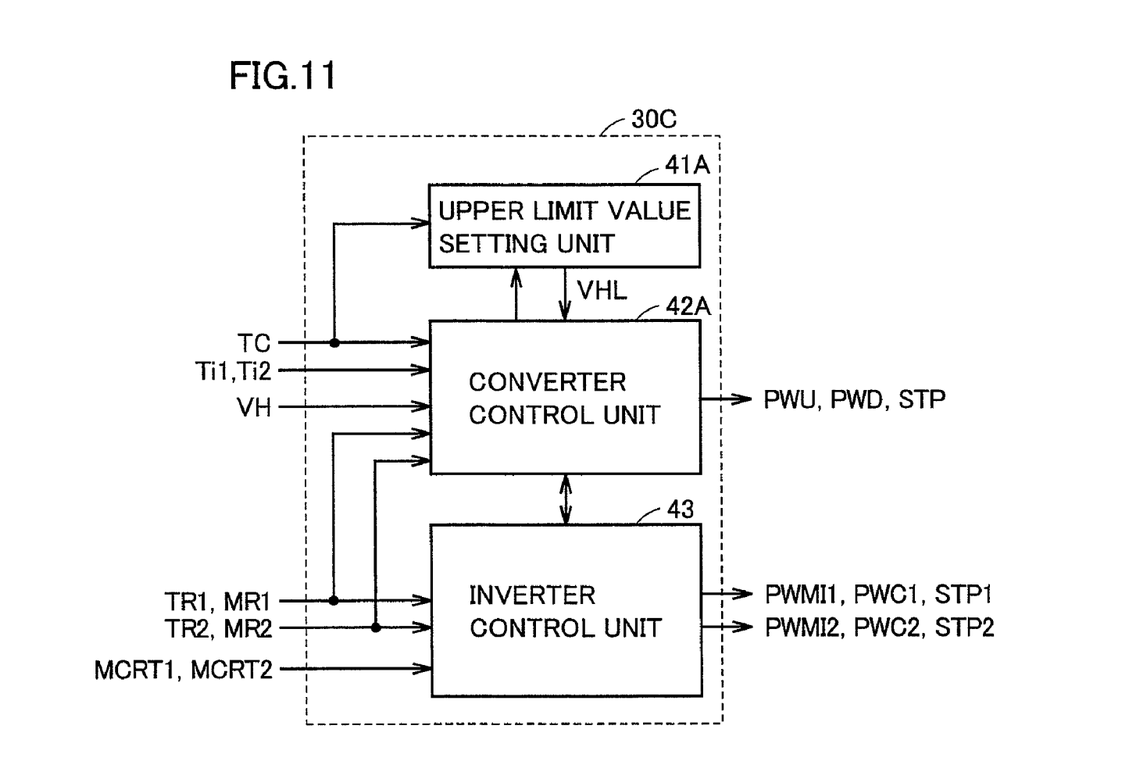
FIG. 11 is a functional block diagram of a control device 30C.

FIG. 11 is a functional block diagram of control device 30C. Referring to FIGS. 11 and 7, control device 30C is different from control device 30B in including an upper limit value setting unit 41A instead of upper limit value setting unit 41. Upper limit value setting unit 41A varies upper limit value VHL of voltage VH in accordance with temperature TC. Upper limit value setting unit 41A stores in advance, for example, a map associating temperature value TC with upper limit value VLM. Then, upper limit value setting unit 41A sets upper limit value VLM based on this map and temperature value TC.

As the configuration of control device 30C is otherwise the same as that of control device 30B, description will not be repeated.

Figure 12:
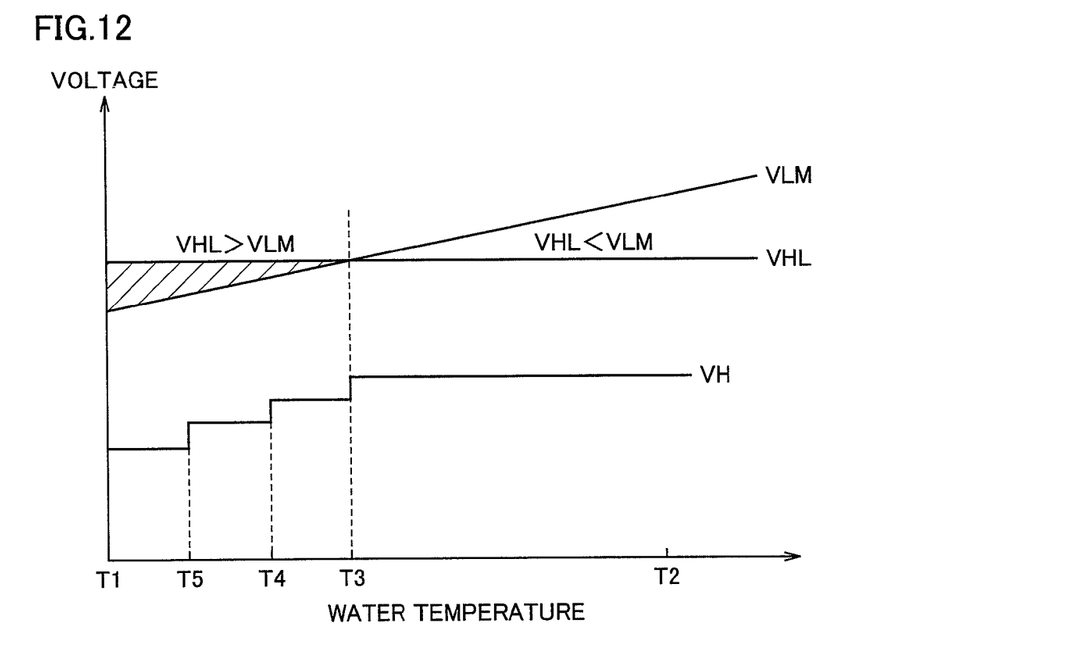
FIG. 12 is a diagram for illustrating a problem that could arise when an upper limit value VHL is constant.

FIG. 12 is a diagram for illustrating a problem that could arise when upper limit value VHL is constant. Referring to FIG. 12, when the temperature of the cooling water is within a range from temperature T3 to temperature T2, withstand voltage VLM is higher than upper limit value VHL. Therefore, when voltage VH is controlled such that it does not exceed upper limit value VHL, voltage VH never exceeds withstand voltage VLM.

Withstand voltage VLM, however, lowers as the temperature is lower. When the temperature of the water is within a range from temperature T1 to temperature T3, upper limit value VHL is higher than withstand voltage VLM. Here, when voltage VH is controlled so as not to exceed upper limit value VEIL, voltage VH may exceed withstand voltage VLM. A hatched region shown in FIG. 12 represents a region where upper limit value VHL is higher than withstand voltage VLM. In this region, overvoltage protection does not effectively function.

In FIG. 12, though voltage VH is varied in a stepwise fashion at temperatures T4 and T5, such a problem arises also when voltage VH is linearly varied.

Figure 13:
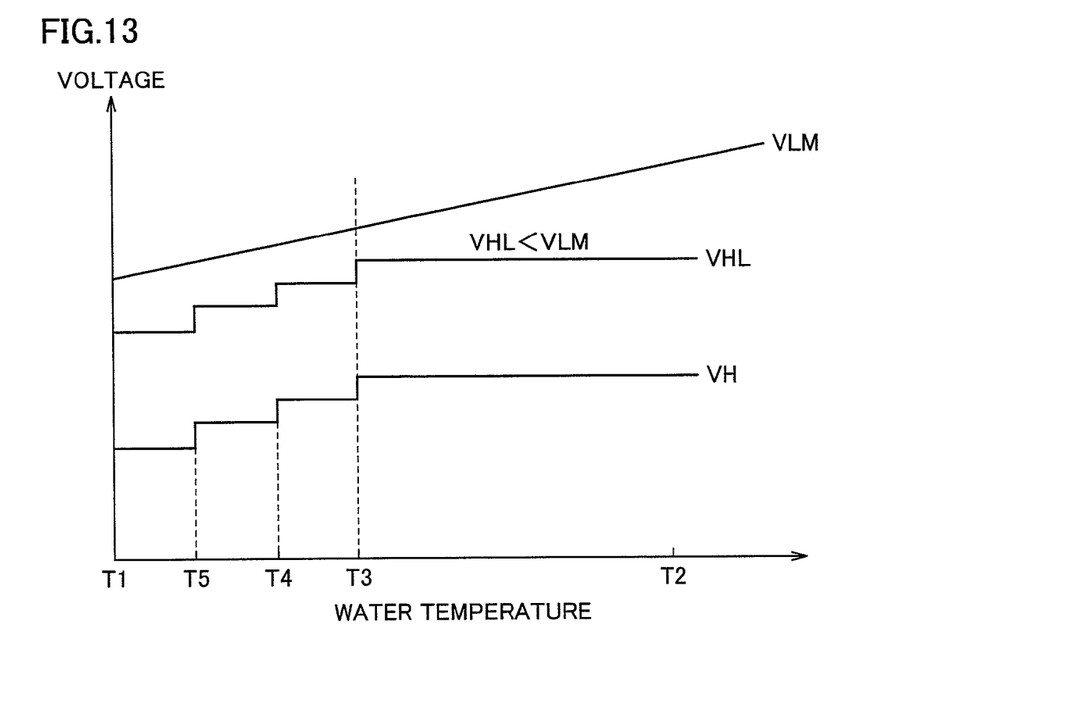
FIG. 13 is a diagram for illustrating control of upper limit value VHL according to a third embodiment.

FIG. 13 is a diagram for illustrating control of upper limit value VHL according to the third embodiment. Referring to FIGS. 13 and 11, when temperature value TC (the temperature of the water) is lower than temperature T3, upper limit value setting unit 41A lowers upper limit value VHL in synchronization with voltage VH. Here, the phrase "in synchronization with voltage VH" means that the temperature of the water at the time when upper limit value setting unit 41A lowers upper limit value VHL is the same as the temperature of the water at the time when voltage VH is lowered, as shown in FIG. 13.

As upper limit value setting unit 41A sets upper limit value VHL in accordance with temperature value TC, upper limit value VHL can be lower than withstand voltage VLM over the entire range from temperature T1 to temperature T2. Therefore, according to the third embodiment, overvoltage protection can effectively function over the entire operation temperature range of the inverter.

Figure 14:
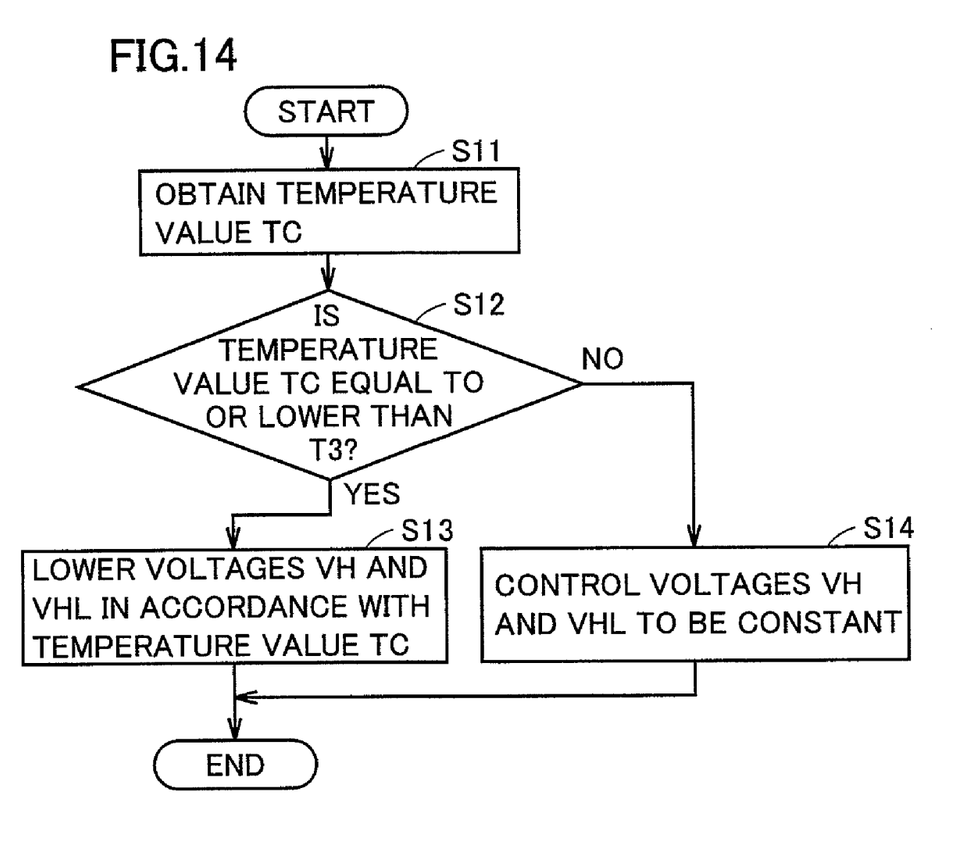
FIG. 14 is a flowchart illustrating control of voltage VH by control device 30C.

FIG. 14 is a flowchart illustrating control of voltage VH by control device 30C. Referring to FIGS. 14 and 11, upper limit value setting unit 41A and converter control unit 42A obtain temperature value TC (step S11). Then, upper limit value setting unit 41A and converter control unit 42A both determine whether temperature value TC is equal to or lower than temperature T3 or not (step S12).

When temperature TC is equal to or lower than temperature T3 (YES in step S12), converter control unit 42A lowers voltage VH in accordance with temperature value TC. Upper limit value setting unit 41A lowers upper limit value VHL in accordance with temperature value TC (step S13).

When temperature TC is higher than temperature T3 (NO in step S12), converter control unit 42A controls voltage VH to be constant. Upper limit value setting unit 41A controls upper limit value VHL to be constant. When the processing in step S13 or step S14 ends, the entire process ends.

As described above, according to the third embodiment, when the temperature of the cooling water for the inverter is lower than a prescribed value, upper limit value VHL of voltage VH is lowered in accordance with the temperature of the water, so that overvoltage protection can effectively function over the entire operation temperature range of the inverter.

Fourth Embodiment

As a configuration of a vehicle according to a fourth embodiment is the same as that of the vehicle according to the third embodiment, description will not be repeated. It is noted that a configuration of a control device included in the vehicle according to the fourth embodiment is the same as that of control device 30C shown in FIG. 11.

In the third embodiment, upper limit value VHL is lowered in synchronization with lowering in voltage VH. In the fourth embodiment, after voltage VH is lowered, upper limit value VHL is lowered. The fourth embodiment is different from the third embodiment in this regard. Control of upper limit value VHL according to the fourth embodiment will be described hereinafter in detail.

Figure 15:
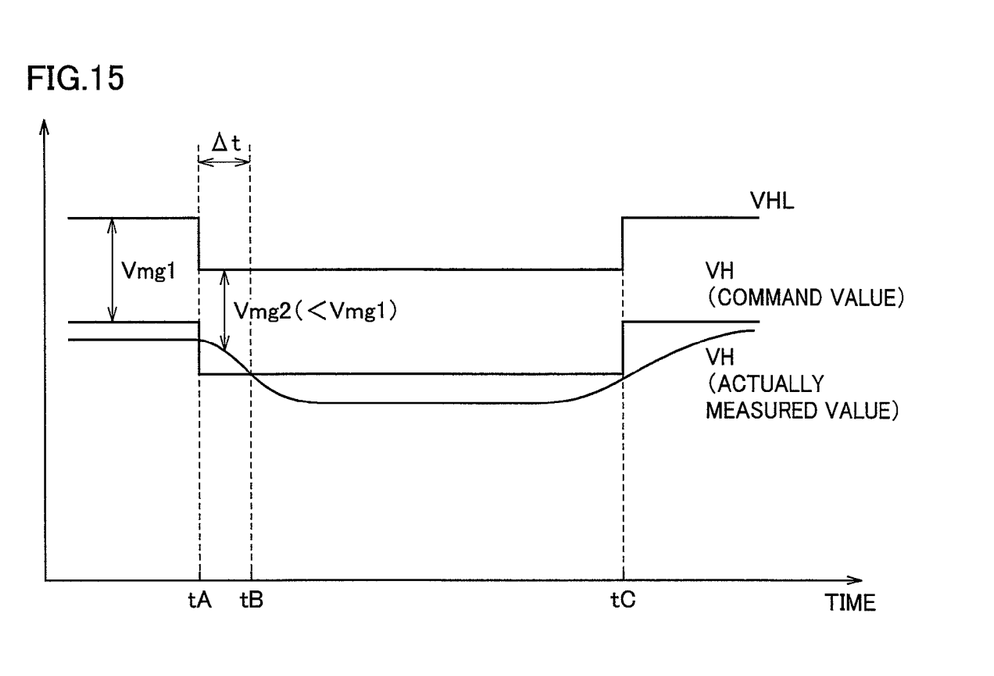
FIG. 15 is a diagram for illustrating a problem that could arise when variation of upper limit value VHL is in synchronization with variation of voltage VH.

FIG. 15 is a diagram for illustrating a problem that could arise when variation of upper limit value VHL is in synchronization with variation of voltage VH. Referring to FIGS. 15 and 11, upper limit value VHL is higher than voltage VH (command value) by a voltage difference Vmg1. Here, the "command value" refers to a value internally generated in converter control unit 12 when converter control unit 42A controls voltage VH. Converter control unit 42A generates boost instruction PWU and step-down instruction PWD based on this command value.

When the temperature of the cooling water is lower than temperature T3 at a time tA, converter control unit 42A lowers voltage VH (command value). In addition, at time tA, upper limit value setting unit 41A lowers upper limit value VHL.

Voltage value VH detected by voltage sensor 13 (an actually measured value) varies after variation of voltage VH (command value). Accordingly, during a period from time tA to a time tB (a period Δt), voltage value VH (actually measured value) is higher than voltage VH (command value), and at time tB, the actually measured value is equal to the command value. During period Δt, a difference between upper limit value VHL and voltage VH (actually measured value) is a voltage difference Vmg2 smaller than voltage difference Vmg1. Therefore, during period Δt, when voltage VH (actually measured value) is raised for some reason, erroneous determination as occurrence of an overvoltage state is more likely. When the overvoltage is detected as described above, the operations of voltage conversion unit 20 and inverters 14 and 14A stop and the behavior of the vehicle may be affected.

Figure 16:
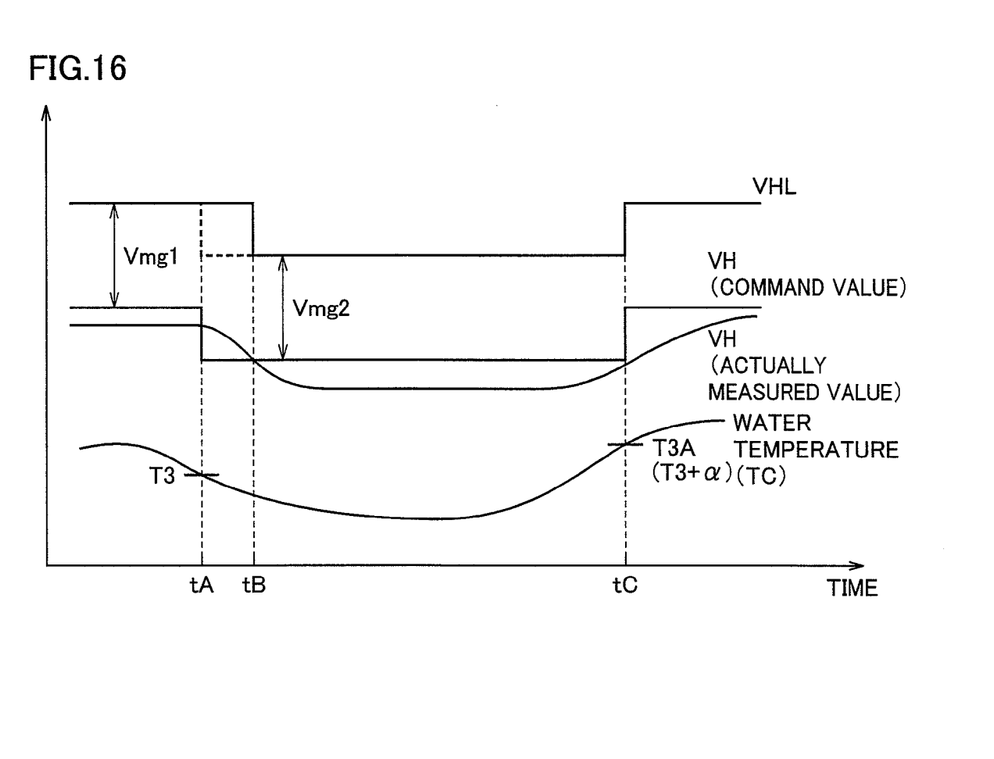
FIG. 16 is a diagram for illustrating control of upper limit value VHL according to a fourth embodiment.

FIG. 16 is a diagram for illustrating control of upper limit value VHL according to the fourth embodiment. Referring to FIG. 16, when temperature TC of the cooling water is lower than temperature T3 at time tA, converter control unit 42A lowers voltage VH (command value). Upper limit value VHL, however, is not lowered simultaneously with voltage VH (command value).

At time tB, voltage VH (actually measured value) is equal to voltage VH (command value). Here, converter control unit 42A issues an instruction to upper limit value setting unit 41A to lower upper limit value VHL. In response to the instruction from converter control unit 42A, upper limit value setting unit 41A lowers upper limit value VHL. As voltage difference Vmg2 can thus be maintained as large as voltage difference Vmg1, the overvoltage can accurately be detected even though upper limit value VHL is lowered.

As shown in FIGS. 15 and 16, at a time tC, upper limit value VHL and voltage VH (command value) are simultaneously raised. The temperature of the water at this time is set to T3A higher than temperature T3 by a prescribed value α. Thus, variation of voltage VH (command value) caused by temperature and variation of upper limit value VHL caused by temperature have hysteresis. In this manner, even when the temperature of the cooling water frequently varies around temperature T3, voltage VH (command value) and upper limit value VHL can be prevented from frequently varying, and therefore control of the inverter can be stable.

Figure 17:
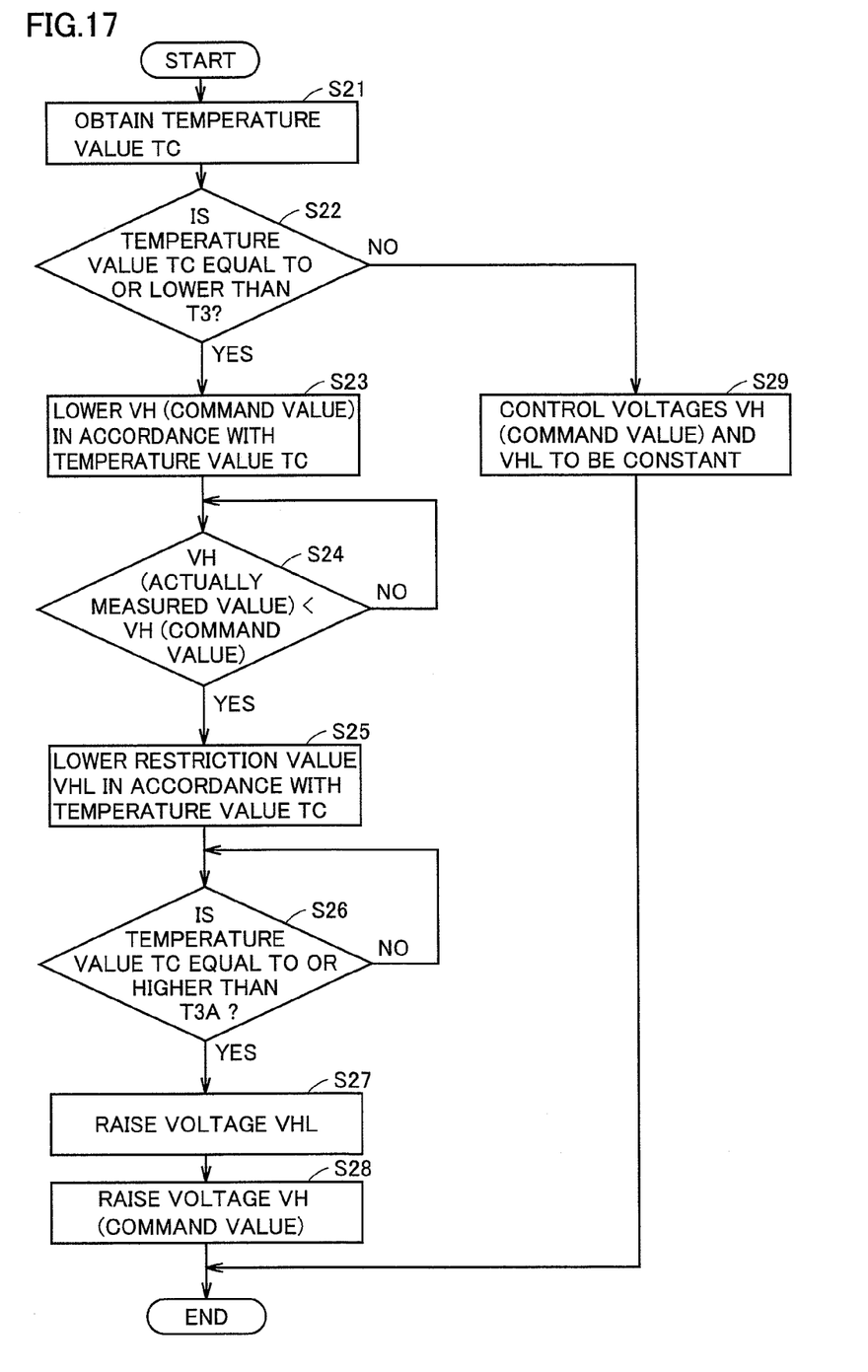
FIG. 17 is a flowchart illustrating control of upper limit value VHL and voltage VH according to the fourth embodiment.

FIG. 17 is a flowchart illustrating control of upper limit value VHL and voltage VH according to the fourth embodiment. Referring to FIGS. 17 and 11, upper limit value setting unit 41A and converter control unit 42A obtain temperature value TC (step S21). Then, upper limit value setting unit 41A and converter control unit 42A both determine whether temperature value TC is equal to or lower than temperature T3 or not (step S22).

When temperature value TC is higher than temperature T3 (NO in step S22), voltage VH (command value) and upper limit value VHL are controlled to be constant (step S29). When the processing in step S29 ends, the entire process ends. When temperature value TC is equal to or lower than temperature T3 (YES in step S22), converter control unit 42A lowers VH (command value) in accordance with temperature value TC (step S23).

In succession, converter control unit 42A determines whether voltage VH (actually measured value) is lower than voltage VH (command value) or not, based on a value detected by voltage sensor 13 (step S24). During period Δt shown in FIG. 16, voltage VH (actually measured value) is not lower than voltage VH (command value). Here (NO in step S24), determination processing in step S24 is repeated. When voltage VH (actually measured value) is lower than voltage VH (command value) (YES in step S24), converter control unit 42A instructs upper limit value setting unit 41A to lower upper limit value VHL. Receiving the instruction from converter control unit 42A, upper limit value setting unit 41A lowers upper limit value VHL in accordance with temperature value TC (step S25). Namely, when temperature value TC is lower than temperature T3 and voltage VH (actually measured value) is lower than voltage VH (command value), upper limit value setting unit 41A lowers upper limit value VHL.

Then, converter control unit 42A and upper limit value setting unit 41A determine whether temperature value TC is equal to or higher than temperature T3A or not (step S26). When temperature value TC is lower than temperature T3A (NO in step S26), determination processing in step S26 is repeated. When temperature value TC is equal to or higher than temperature T3A, upper limit value setting unit 41A raises upper limit value VHL (step S27) and converter control unit 42A raises voltage VH (command value) (step S28). When the processing in step S28 ends, the entire process ends.

Thus, according to the fourth embodiment, even though upper limit value VHL is lowered, the overvoltage can accurately be detected.

It is noted that the vehicle incorporating the inverter control device in each embodiment described above is not limited to the hybrid vehicle and the vehicle may be, for example, an electric vehicle.

In addition, the cooling water is adopted as the heat exchange medium exchanging heat with the inverter in the second, third and fourth embodiments, however, various media such as cooling air and a cooling oil may be used as the heat exchange medium.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

The invention claimed is:

1. An inverter control device for controlling an inverter, comprising:
    a DC power supply for outputting a first DC voltage;
    a voltage conversion unit for converting a voltage level of said first DC voltage and supplying a second DC voltage to said inverter;

a temperature detection unit for detecting an ambient temperature of said inverter; and a control unit for controlling said voltage conversion unit based on a result of detection by said temperature detection unit, and for controlling an operation of said inverter such that said second DC voltage is converted to an AC voltage while stopping said inverter when it is determined that said second DC voltage exceeds an upper limit value, and said control unit lowering said second DC voltage in accordance with lowering in said ambient temperature, and lowering said upper limit value after said second DC voltage is lowered.

2. The inverter control device according to claim 1, further comprising a heat exchange device for exchanging heat with said inverter by circulating a heat exchange medium capable of exchanging heat with said inverter, wherein said ambient temperature is a temperature of said heat exchange medium.

3. The inverter control device according to claim 2, wherein said heat exchange medium is cooling water.

4. The inverter control device according to claim 1, wherein said control unit controls said voltage conversion unit such that said second DC voltage is lower as said ambient temperature is lower, when it is determined that said ambient temperature is lower than a prescribed temperature.

5. The inverter control device according to claim 4, wherein said control unit sets an operation frequency of said inverter differently between a case where said ambient temperature is higher than said prescribed temperature and a case where said ambient temperature is lower than said prescribed temperature.

6. A vehicle, comprising:
an inverter;
a DC power supply for outputting a first DC voltage;
a voltage conversion unit for converting a voltage level of said first DC voltage and supplying a second DC voltage to said inverter;

a temperature detection unit for detecting an ambient temperature of said inverter; and a control unit for controlling said voltage conversion unit based on a result of detection by said temperature detection unit, and for controlling an operation of said inverter such that said second DC voltage is converted to an AC voltage while stopping said inverter when it is determined that said second DC voltage exceeds an upper limit value, and said control unit lowering said second DC voltage in accordance with lowering in said ambient temperature, and lowering said upper limit value after said second DC voltage is lowered.

7. The vehicle according to claim 6, further comprising a heat exchange device for exchanging heat with said inverter by circulating a heat exchange medium capable of exchanging heat with said inverter, wherein said ambient temperature is a temperature of said heat exchange medium.

8. The vehicle according to claim 7, wherein
said heat exchange medium is cooling water.

9. The vehicle according to claim 6, wherein
said control unit controls said voltage conversion unit such that said second DC voltage is lower as said ambient temperature is lower, when it is determined that said ambient temperature is lower than a prescribed temperature.

10. The vehicle according to claim 9, wherein
said control unit sets an operation frequency of said inverter differently between a case where said ambient temperature is higher than said prescribed temperature and a case where said ambient temperature is lower than said prescribed temperature.

\* \* \* \* \*